June 29, 1926.
J. W. GODDARD
ICE CREAM FREEZER
Filed March 3, 1923
1,590,939
3 Sheets-Sheet 1
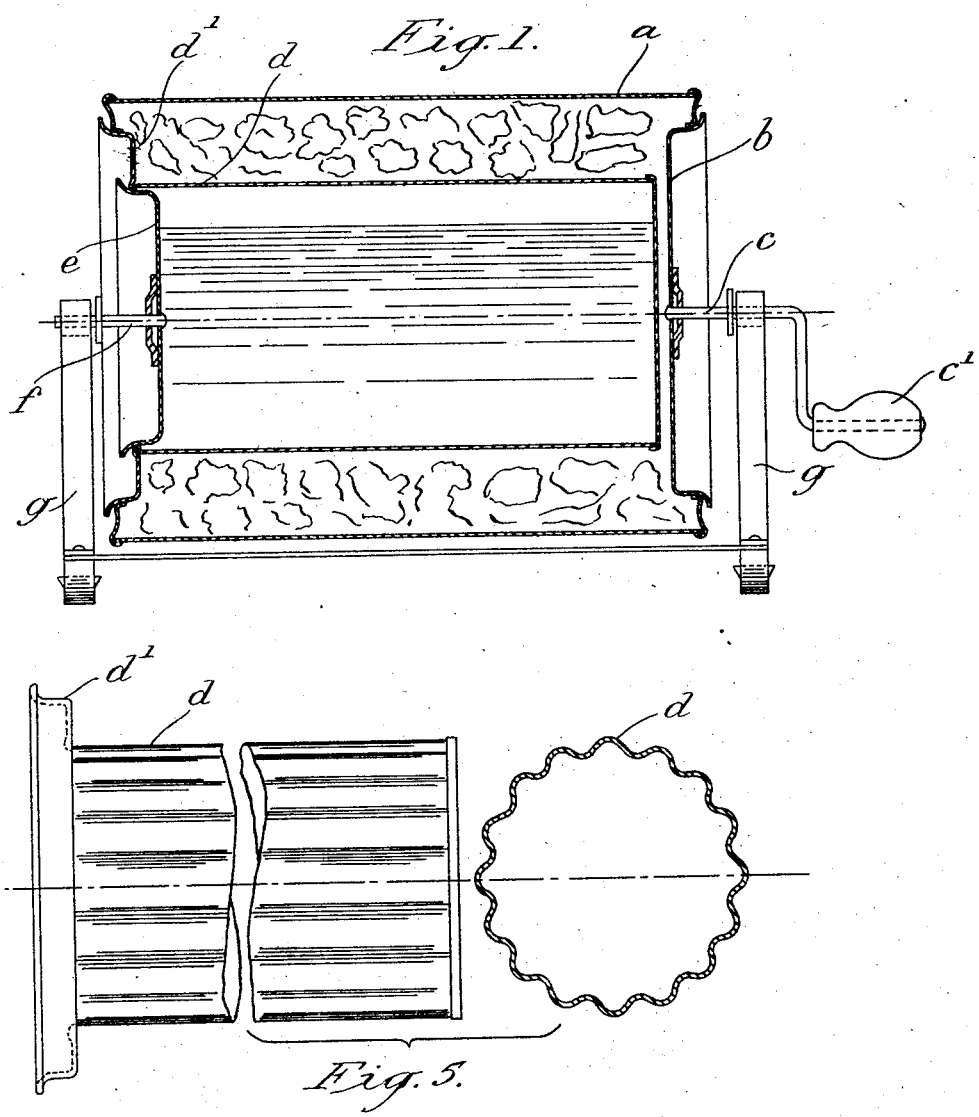
Inventor
James Watts Goddard
By
Attorney

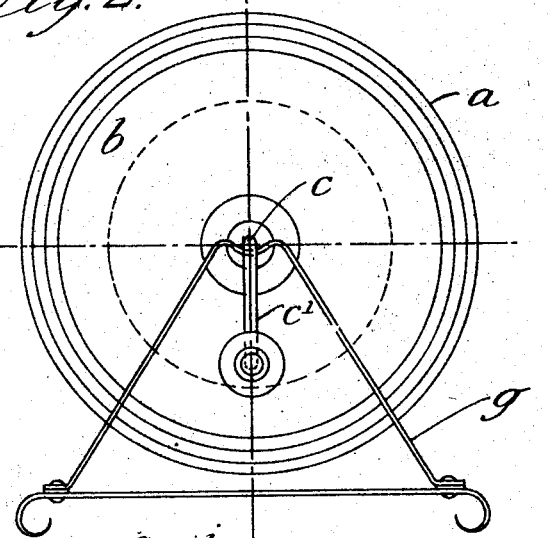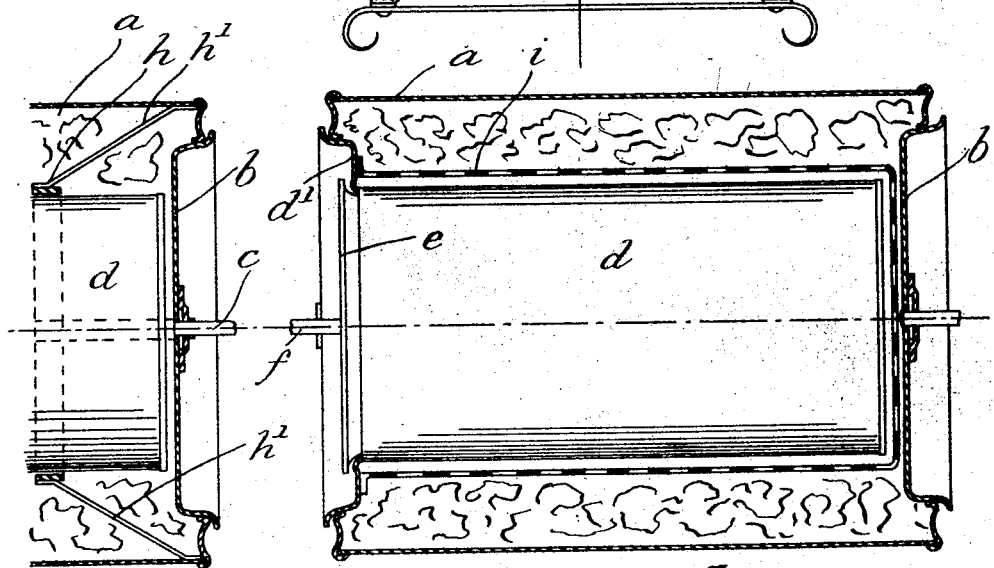

June 29, 1926.
J. W. GODDARD
ICE CREAM FREEZER
Filed March 3, 1923
1,590,939
3 Sheets-Sheet 3
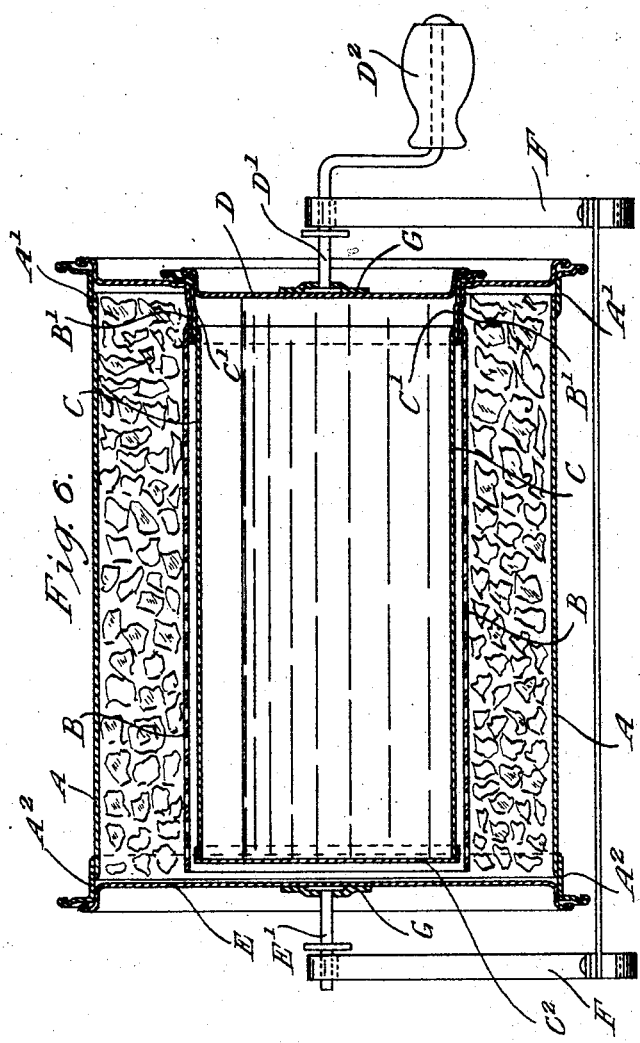
Inventor
James Watts Goddard
By
Attorney Patented June 29, 1926.

1,590,939

UNITED STATES PATENT OFFICE.

JAMES WATTS GODDARD, OF LONDON, ENGLAND, ASSIGNOR TO NETTLEFOLD & SONS LIMITED, OF LONDON, ENGLAND.

ICE-CREAM FREEZER.

Application filed March 3, 1923, Serial No. 622,627, and in Great Britain May 27, 1922.

This invention relates to ice cream freezing apparatus of the kind which comprise an outer and an inner cylinder both hermetically closed and adapted to be rotated together, as by means of trunnion pins attached respectively to the end cover plates of the two cylinders.

One object of the present invention is to provide an improved construction of such apparatus which will enable the cylinders to be readily taken apart for the purpose of washing and drying, and also for the purpose of substituting a second inner cylinder after the contents of the first inner cylinder have been frozen, thereby enabling a second charge to be frozen without emptying the freezing mixture from the outer cylinder and re-charging the same, to accomplish which the freezing mixture is imprisoned between the outer cylinder and a perforated cylinder or basket encircling the inner cylinder.

In the improved construction the outer cylinder has a circular aperture at each end, the diameter of which may approximate that of the outer cylinder itself, one of these apertures being closed by a flanged fluid-tight cover plate in the manner common in the closure of tins for holding liquid contents. The other aperture is adapted to receive the inner cylinder which is formed with a flange fitting into this aperture in the same manner as just indicated so as to make a liquid-tight joint therewith. The inner cylinder is permanently closed at one end and the aperture in the other end, which is preferably of the full diameter of the inner cylinder, is closed liquid-tight by a flanged cover plate in the same manner. This last mentioned cover plate and also the cover plate of the outer cylinder at the opposite end of the apparatus are provided with trunnions projecting outwardly therefrom in the line of the axis of the apparatus and the whole apparatus may be rotated by means of these trunnions, either by a wire handle embracing the apparatus, whereby it may be rolled on a flat surface by hand, or one of the trunnions may be provided with a crank handle and the apparatus supported by its trunnions upon a suitable frame.

In a modified construction the perforated cylinder which encircles the inner cylinder or cream container has a flanged rim, into the inside of which the similarly flanged rim of the cream cylinder fits liquid-tight while the flanged rim of said perforated cylinder itself fits liquid-tight into the inside of a flanged rim on one end of the outer cylinder.

To ensure liquid-tight fitting at the various joints hereinbefore specified, the flanges of the outer cylinder, of the perforated cylinder and of the inner cylinder are formed to gauge, by means of dies, separately from the respective cylinders and are subsequently brazed or otherwise rigidly attached to said cylinders.

One embodiment of the apparatus is illustrated in the accompanying drawings, wherein Fig. 1 is a central longitudinal section of the apparatus mounted on a supporting frame; Fig. 2 is an end elevation thereof; Fig. 3 is a longitudinal section, partly in elevation, showing an optional additional feature; Fig. 4 is a part longitudinal section showing another such additional feature; Fig. 5 shows in elevation and cross section a modified construction of the inner cylinder; and Fig. 6 is a longitudinal section of another modified construction.

Referring particularly to Figs. 1, 2 and 3, $a$ is the outer cylinder which has at each end a circular aperture the diameter of which is, as shown, slightly less than the diameter of the cylinder. The aperture at one end is closed liquid-tight by means of the flanged cover plate $b$ which has rigidly attached to it an axial trunnion $c$. The inner cylinder $d$ is closed permanently at that end which in the assembled apparatus is adjacent to the cover plate $b$ and has at its other end an annular flanged rim $d'$ integral with the cylinder and adapted to fit liquid-tight into the aperture at the other end of the cylinder $a$. The open end of cylinder $d$ is closed by a flanged cover plate $e$ which has rigidly attached to it a trunnion $f$ in axial alignment with trunnion $c$. As shown in the drawings, trunnion $c$ is provided with a crank handle $c'$ and the two trunnions are supported in suitable open bearings on a frame $g$ so as to be readily removable therefrom.

In using the apparatus the cylinder $d$ is first of all inserted in the outer cylinder $a$ which is then placed in a vertical position with the open end uppermost; the space between the two cylinders is charged with the freezing mixture and cover plate $b$ applied;

the position of the apparatus is reversed, and the inner cylinder charged with the mixture to be frozen and cover plate e applied. The apparatus is now ready for use either by placing it upon the stand g and rotating it by means of the crank handle c', or by rolling it upon a plane surface. When the freezing operation is completed, the inner cylinder is removed with its contents and a second similar cylinder may be substituted for it containing another charge to be frozen. Unless special provision is made this would involve the emptying out of the freezing mixture from the the outer cylinder and re-charging the latter with the freezing mixture after insertion of the substitute inner cylinder. To obviate this the apparatus may be provided, as shown in Fig. 3, with a perforated basket i enveloping the inner cylinder. This basket is preferably loose and of such a length as just to fit between the lid or cover plate b of the outer cylinder and the rim d' of the inner cylinder. Alternatively it may be attached at one end to the cover plate b so as to be withdrawn therewith when the latter is removed. By means of this basket the inner cylinder d may be removed and another similar cylinder inserted without disturbance of the freezing mixture or the necessity for emptying and re-charging the outer cylinder.

Any strain on the joints at the outer end of cylinder d may be relieved, as indicated in Fig. 4, by means of a ring h which encircles the inner end of cylinder d and is supported by a spider frame or arms h' extending between the ring and the outer cylinder. These arms may be rigidly attached to the outer cylinder, but not necessarily so.

To increase the conducting surface and thereby facilitate the freezing operation, the inner cylinder may be corrugated as shown, for example, in Fig. 5 in which this cylinder is made with a longitudinally corrugated wall.

In the modified construction shown in Fig. 6, A is the outer cylinder which is provided with flanges A', A² at its respective ends, these flanges being soldered or otherwise rigidly secured on the outside surface of the cylinder A. B is a perforated cylinder which closely encircles the inner cylinder C and serves the purpose of retaining the freezing mixture when the inner cylinder is removed for the purpose of recharging. The cylinder B may, as shown in Fig. 6, be open at one end, in which case such open end approximates closely to the adjacent end of cylinder A; or the cylinder B may be provided with a closed end. The other end of the perforated cylinder B is provided with a flanged rim B' brazed or soldered to the end of the cylinder, either on its inside surface as shown, or externally thereto, and the flange of the rim is shaped by dies to fit liquid-tight into the flanged rim A' of the outer cylinder. In the same way the inner cylinder C, which contains the mixture to be frozen, as a flanged rim C' brazed or soldered around the outer periphery of its open end and shaped to fit liquid-tight into the mouth of the rim B' of the perforated cylinder B, the opposite end of the inner cylinder being permanently closed by the bottom C².

The open end of the inner cylinder C is closed by a cover plate D which is shaped to fit liquid-tight into the flanged rim C' of the cylinder and the opposite end of the outer cylinder A is similarly closed by a cover plate E, the flange of which is arranged to fit liquid-tight into the flanged rim A².

As shown in the drawings, the two lids or cover plates D, E may have rigidly attached thereto trunnions or spindles D', E' respectively, by means of which the whole apparatus may be rotated in a known manner either by a wire handle embracing the apparatus and forming journals for the trunnions, whereby it may be rolled on a flat surface by hand, or one of the trunnions, for example D', may be provided with a crank handle D² and the apparatus supported by its trunnions in bearings upon a suitable frame F.

It may be preferable, for the purpose of filling the interspace between cylinders A and B with the freezing mixture, to make the spindle D' detachable from the cover plate D, while still maintaining a driving engagement therewith, and this may conveniently be effected by making the end of the spindle D' of non-circular shape and fitting into a correspondingly shaped hole in a disc G secured to the cover plate D. A collar on the spindle D' inside the bearing on the stand F serves to prevent the disengagement of the end of the spindle D' with the disc G when the apparatus is rotated by the crank handle D².

An apparatus of the construction hereinbefore described has the advantage that each of the cylinders can be readily cleaned, both inside and out, and replaced in position, there being no projections or ledges whereon either the legitimate contents of the cylinders or any foreign matter can lodge, or which interfere with the manual cleaning of the apparatus.

The capacity of the apparatus can be increased by providing an auxiliary cover plate for the inner cylinder C, this cover plate being substituted for the cover plate D when the contents of the cylinder C have been frozen and the cylinder itself removed from the apparatus to give place to a second freshly charged inner cylinder. The cover plate is preferably provided with a handle for convenience in applying and removing.

Having thus described the nature of the said invention and the best means I know of carrying the same into practical effect, I claim:—

1. An icecream freezing apparatus of the kind herein referred to comprising in combination an outer cylinder having circular apertures at each end, a closure plate for said outer cylinder fitting liquid-tight in one one of these apertures, an inner cylinder permanently closed at one end by an imperforate plate independent of the closure means for the ends of the outer cylinder, a closure plate fitting liquid-tight in the open end of said inner cylinder, said inner cylinder together with the closure plate being integrally removable from the outer cylinder, and removable closure means for the interspace between the outer and inner cylinders, said closure means fitting liquid-tight into the second aperture of the outer cylinder.

2. An apparatus as claimed in claim 1, comprising in combination a perforated cylinder encircling the inner cylinder, a flanged rim secured to said perforated cylinder, a flanged rim on the inner cylinder fitting liquid-tight into the first mentioned flanged rim, a cover plate for one end of the inner cylinder fitting liquid-tight into the said flanged rim of the inner cylinder and a flanged rim on the outer cylinder fitting liquid-tight around the flanged rim of the perforated cylinder.

3. An apparatus as claimed in claim 1, comprising axially disposed trunnions secured respectively to the removable closure plate of the inner cylinder and to the removable closure plate at the opposite end of the outer cylinder.

4. An apparatus as claimed in claim 1, comprising a ring encircling the inner end of the inner cylinder and arms extending between and secured to the ring and the outer cylinder.

5. An apparatus as claimed in claim 1, comprising an inner cylinder formed with a corrugated wall for the purpose set forth.

In testimony whereof I have signed my name to this specification.

JAMES WATTS GODDARD.